US012057698B2

(12) United States Patent
Hidaka (10) Patent No.: US 12,057,698 B2
(45) Date of Patent: Aug. 6, 2024

(54) POWER MANAGEMENT SYSTEM AND POWER MANAGEMENT METHOD

(71) Applicant: KYOCERA Corporation, Kyoto (JP)

(72) Inventor: Hiroyuki Hidaka, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 638 days.

(21) Appl. No.: 17/270,845

(22) PCT Filed: Aug. 22, 2019

(86) PCT No.: PCT/JP2019/032879
§ 371 (c)(1),
(2) Date: Feb. 23, 2021

(87) PCT Pub. No.: WO2020/040261
PCT Pub. Date: Feb. 27, 2020

(65) Prior Publication Data
US 2021/0344221 A1 Nov. 4, 2021

(30) Foreign Application Priority Data
Aug. 24, 2018 (JP) .................. 2018-156876

(51) Int. Cl.
*H02J 1/00* (2006.01)
*H02J 3/46* (2006.01)
*H02J 13/00* (2006.01)
(52) U.S. Cl.
CPC ........ *H02J 13/00001* (2020.01); *H02J 3/466* (2020.01); *H02J 13/00002* (2020.01)
(58) Field of Classification Search
CPC ........... H02J 13/00001; H02J 13/00002; H02J 13/466
See application file for complete search history.

(56) References Cited

U.S. PATENT DOCUMENTS 6,536,215 B1 * 3/2003 Vikstrom ................ F01K 17/02
60/645
8,239,280 B1 * 8/2012 Feinberg ................ G06Q 40/00
705/26.35
(Continued)

FOREIGN PATENT DOCUMENTS

CN 104036434 A * 9/2014 .......... H04W 52/225
JP 2005182399 A 7/2005
(Continued)

OTHER PUBLICATIONS

Shabanzadeh et al. "Risk-based medium-term trading strategy for a virtual power plant with first-order stochastic dominance constraints" (2016) (https://ietresearch.onlinelibrary.wiley.com/doi/pdf/10.1049/iet-gtd.2016.1072) (Year: 2016).*

(Continued)

*Primary Examiner* — Sujay Koneru
(74) *Attorney, Agent, or Firm* — HAUPTMAN HAM, LLP (57) ABSTRACT

A power management system for providing a mechanism of power transaction between two or more facilities connected to a power grid, the system includes a controller configured to extract, from the two or more facilities, a power selling facility other than a power purchasing facility by an input from a user terminal corresponding to the power purchasing facility which is one of the two or more facilities, and calculate a score indicating a value of the power transaction based on a communication time in a communication path between the power selling facility and the power purchasing facility, and a notification unit configured to notify the user terminal of the score.

20 Claims, 7 Drawing Sheets

(56) References Cited

U.S. PATENT DOCUMENTS

| | | | | |
|---|---|---|---|---|
| 2002/0087234 | A1* | 7/2002 | Lof | G06Q 50/06 700/297 |
| 2003/0110121 | A1* | 6/2003 | Miyamoto | G06Q 40/02 705/37 |
| 2003/0193901 | A1* | 10/2003 | Ishibashi | H04L 45/02 370/252 |
| 2003/0225661 | A1* | 12/2003 | Peljto | G06Q 40/06 705/36 R |
| 2004/0039684 | A1* | 2/2004 | Sandor | G06Q 10/10 705/37 |
| 2007/0061153 | A1* | 3/2007 | Althen | G06Q 10/06375 705/7.37 |
| 2010/0217550 | A1* | 8/2010 | Crabtree | H02J 3/007 702/62 |
| 2012/0083927 | A1* | 4/2012 | Nakamura | F24F 11/64 700/278 |
| 2013/0035795 | A1* | 2/2013 | Pfeiffer | G05B 15/02 700/276 |
| 2013/0218548 | A1* | 8/2013 | Lazaris | G05B 15/02 703/18 |
| 2014/0039710 | A1* | 2/2014 | Carter | G05B 13/041 700/291 |
| 2015/0094968 | A1* | 4/2015 | Jia | G05B 15/02 702/60 |
| 2015/0131458 | A1* | 5/2015 | Scharf | H04L 45/123 370/252 |
| 2015/0149249 | A1* | 5/2015 | Mansfield | G06Q 50/06 705/7.31 |
| 2016/0056631 | A1* | 2/2016 | Ilo | H02J 3/38 700/287 |
| 2016/0217022 | A1* | 7/2016 | Velipasaoglu | G06F 11/0709 |
| 2016/0258361 | A1* | 9/2016 | Tiwari | G06Q 10/06 |
| 2016/0281607 | A1* | 9/2016 | Asati | F02C 7/26 |
| 2016/0314544 | A1* | 10/2016 | Scuderi | G06Q 40/04 |
| 2017/0155566 | A1* | 6/2017 | Martinsen | H04L 43/10 |
| 2017/0373535 | A1* | 12/2017 | Dam | H02J 13/00007 |
| 2018/0063767 | A1* | 3/2018 | Matos | H04W 40/026 |
| 2018/0070285 | A1* | 3/2018 | Benko | H04L 43/0888 |
| 2018/0088545 | A1* | 3/2018 | Fuchs | G05B 15/02 |
| 2018/0366979 | A1* | 12/2018 | Granger | H02J 3/381 |
| 2019/0213693 | A1* | 7/2019 | Itaya | H02J 3/381 |
| 2019/0372345 | A1* | 12/2019 | Bain | G06Q 30/0601 |

FOREIGN PATENT DOCUMENTS

| | | |
|---|---|---|
| JP | 2011223740 A | 11/2011 |
| JP | 2013187935 A | 9/2013 |

OTHER PUBLICATIONS

Jiao Cheng-Bo et al., Research on the Correlation between Network Delay and Geographic Distance in Internet, Journal of University of Electronic Science and Technology of China, Sep. 2012, pp. 781-786, vol. 41 No. 5, 6pp.

* cited by examiner

| TYPE OF POWER SUPPLY | STABILITY | EXPECTED VALUE | $CO_2$ EMISSIONS | DISTRIBUTED POWER SUPPLY | OPERATING COST | DAMAGE RISK | SCORE |
|---|---|---|---|---|---|---|---|
| STORAGE BATTERY APPARATUS | 3 | 7 | 10 | 10 | 8 | 10 | 168,000 |
| SOLAR CELL APPARATUS | 2 | 5 | 10 | 10 | 10 | 10 | 100,000 |
| FUEL CELL APPARATUS | 10 | 6 | 5 | 10 | 3 | 10 | 90,000 |
| WIND POWER PLANT | 3 | 5 | 10 | 1 | 10 | 10 | 15,000 |
| THERMAL POWER PLANT | 10 | 10 | 3 | 1 | 2 | 5 | 3,000 |
| NUCLEAR POWER PLANT | 10 | 10 | 10 | 1 | 3 | 1 | 3,000 |

FIG. 4

| No. | FACILITY | POWER SUPPLY | RTT | POWER GENERATION AMOUNT | START TIME | END TIME | SCORE |
|---|---|---|---|---|---|---|---|
| 1 | 100B | STORAGE BATTERY APPARATUS | 1 | 1.5 | 5:00 | 12:00 | 168,000.00 |
| 2 | 100C | SOLAR CELL APPARATUS | 1 | 2 | 10:00 | 16:00 | 100,000.00 |
| 3 | 100B | SOLAR CELL APPARATUS | 1 | 2.1 | 10:00 | 16:00 | 100,000.00 |
| 4 | 100A | SOLAR CELL APPARATUS | 2 | 3 | 10:00 | 16:00 | 50,000.00 |
| 5 | 100D | STORAGE BATTERY APPARATUS | 12 | 2 | 7:00 | 12:00 | 14,000.00 |
| 6 | 100D | SOLAR CELL APPARATUS | 12 | 5 | 10:00 | 16:00 | 8,333.33 |
| 9 | 100D | FUEL CELL APPARATUS | 12 | 1.5 | 0:00 | 23:59 | 7,500.00 |
| 7 | 100E | STORAGE BATTERY APPARATUS | 130 | 3 | 8:00 | 18:00 | 1,292.31 |
| 8 | 100E | SOLAR CELL APPARATUS | 130 | 3 | 10:00 | 16:00 | 769.23 |
| 10 | 300C | WIND POWER PLANT | 104 | 1000 | 0:00 | 23:59 | 144.23 |
| 11 | 300A | THERMAL POWER PLANT | 105 | 20000 | 0:00 | 23:59 | 28.57 |
| 12 | 300B | NUCLEAR POWER PLANT | 110 | 20000 | 0:00 | 23:59 | 27.27 |

| No. | FACILITY | POWER SUPPLY | NUMBER OF HOPS | POWER GENERATION AMOUNT | START TIME | END TIME | SCORE |
|---|---|---|---|---|---|---|---|
| 1 | 100B | STORAGE BATTERY APPARATUS | 1 | 1.5 | 5:00 | 12:00 | 168,000 |
| 2 | 100C | SOLAR CELL APPARATUS | 1 | 2 | 10:00 | 16:00 | 100,000 |
| 3 | 100B | SOLAR CELL APPARATUS | 1 | 2.1 | 10:00 | 16:00 | 100,000 |
| 4 | 100A | SOLAR CELL APPARATUS | 2 | 3 | 10:00 | 16:00 | 50,000 |
| 5 | 100D | STORAGE BATTERY APPARATUS | 3 | 2 | 7:00 | 12:00 | 56,000 |
| 7 | 100E | STORAGE BATTERY APPARATUS | 4 | 3 | 8:00 | 18:00 | 42,000 |
| 6 | 100D | SOLAR CELL APPARATUS | 3 | 5 | 10:00 | 16:00 | 33,333 |
| 9 | 100D | FUEL CELL APPARATUS | 3 | 1.5 | 0:00 | 23:59 | 30,000 |
| 8 | 100E | SOLAR CELL APPARATUS | 4 | 3 | 10:00 | 16:00 | 25,000 |
| 10 | 300C | WIND POWER PLANT | 10 | 1000 | 0:00 | 23:59 | 1,500 |
| 11 | 300A | THERMAL POWER PLANT | 10 | 20000 | 0:00 | 23:59 | 300 |
| 12 | 300B | NUCLEAR POWER PLANT | 10 | 20000 | 0:00 | 23:59 | 300 |

POWER MANAGEMENT SYSTEM AND POWER MANAGEMENT METHOD

RELATED APPLICATIONS

The present application is a National Phase of International Application No. PCT/JP2019/032879, filed Aug. 22, 2019, and claims priority based on Japanese Patent Application No. 2018-156876, filed Aug. 24, 2018.

TECHNICAL FIELD

The present invention relates to a power management system and a power management method.

BACKGROUND ART

In recent years, a technique using a distributed power supply provided in a facility (for example, VPP (Virtual Power Plant)) in order to maintain a balance between supply and demand of power in a power grid has been known (for example, Patent Literature 1). Furthermore, the power trading market, which realizes purchase and sale of power, is also attracting attention as a method of using the distributed power supply provided in the facility.

CITATION LIST

Patent Literature

Patent Literature 1: Japanese application publication No. 2005-182399

SUMMARY OF INVENTION

A power management system according to a first feature is for providing a mechanism of power transaction between two or more facilities connected to a power grid. The power management system includes a controller and a communication unit. The controller is configured to determine, from two or more facilities, a first facility to sell power other than a second facility to purchase power by an input from a user terminal corresponding to the second facility which is one of the two or more facilities, and calculate a score indicating an evaluation of the first facility based on a communication time in a communication path between the first facility and the second facility. The communication unit is configured to notify the user terminal of the score.

A power management method according to a second feature is for providing a mechanism of power transaction between two or more facilities connected to a power grid. The power management method includes: determining, from two or more facilities, a first facility to sell power other than a second facility to purchase power by an input from a user terminal corresponding to the second facility which is one of the two or more facilities; calculating a score indicating an evaluation of the first facility based on a communication time in a communication path between the first facility and the second facility; and notifying the user terminal of the score.

DESCRIPTION OF EMBODIMENTS

In the power trading market described above, the purchase and sale of power is realized by matching selling bid for power and buying bid for power. In general, since it is possible to cover the power consumption of the facility with a base power supply connected to a high-voltage power grid or the like, the above-mentioned matching is not required to be in real-time, and can be performed virtually.

However, assuming a case where power is bought and sold in real-time between facilities in which a distance of a power path to the base power supply is equal to or greater than a threshold value (for example, facilities connected to a low-voltage power grid), there is a possibility that the power consumption of the facility cannot be quickly covered by the base power supply. Therefore, if the timing of reverse power flow from the facility to the power grid (selling bid for power) and the timing of power flow from the power grid to the facility (buying bid for power) are not met, the balance between supply and demand of power of the power grid in an area where the facility is provided may be lost.

Therefore, the present disclosure has been made in order to solve the above-mentioned problems, and provides a power management system and a power management method that can appropriately realize matching between a power purchasing facility and a power selling facility.

Hereinafter, embodiments will be described with reference to the drawings. In the following description of the drawings, the same or similar parts are denoted by the same or similar reference numerals.

However, it should be noted that the drawings are schematic and ratios of each dimension may be different from actual dimensions. Therefore, specific dimensions should be determined in consideration of the following description. In addition, it is needless to say that the drawings may include portions having different dimensional relationships or ratios.

EMBODIMENTS

Figure 1:
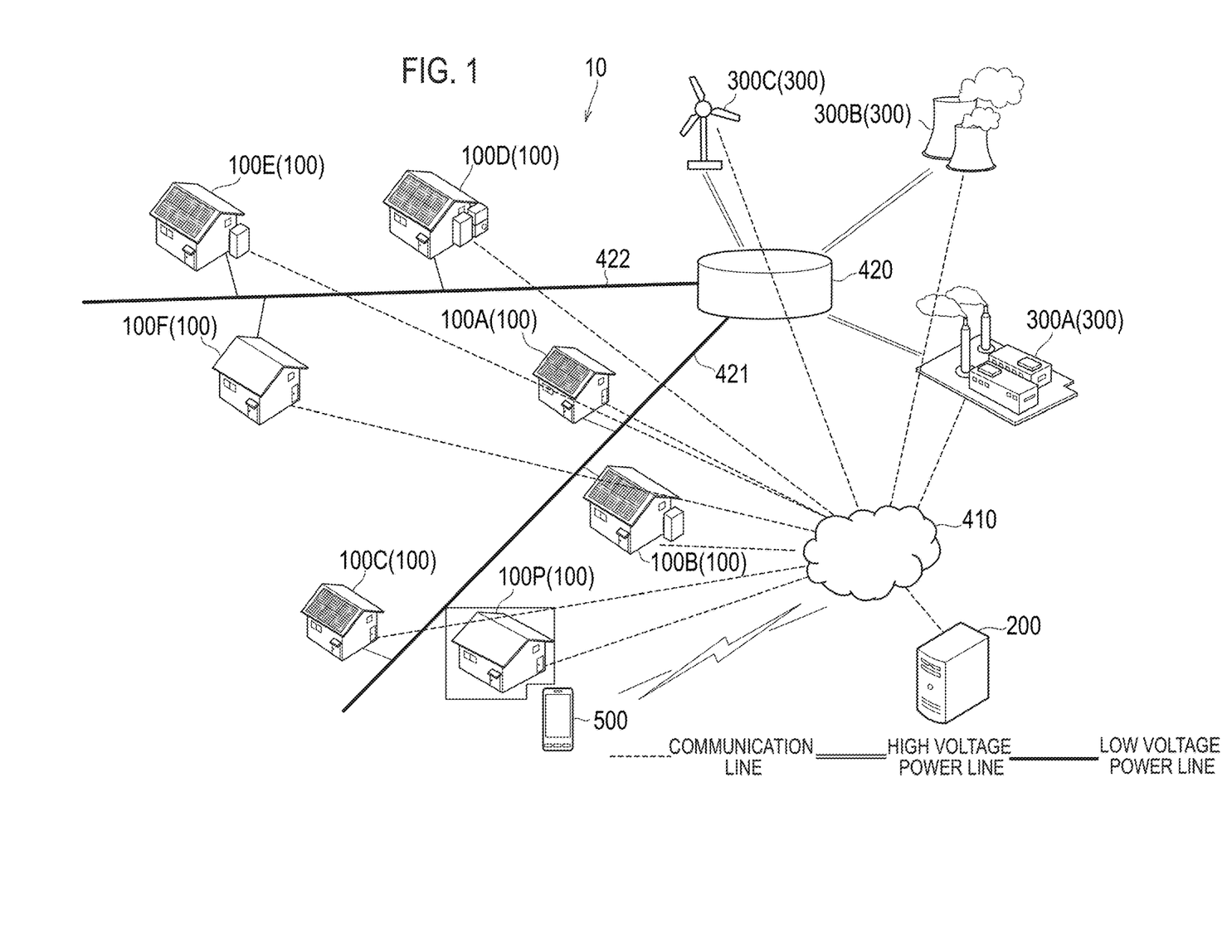
FIG. 1 is a diagram illustrating a power management system 10 according to an embodiment.

The power management system according to an embodiment will be described below. A power management system 10 includes a facility 100, a power management server 200, a facility 300, a network 410, a substation equipment 420, and a user terminal 500.

The facility 100 is connected to a low voltage power line. The low voltage power line is an example of the power grid, and is a power line corresponding to a voltage lower than that of a high voltage power line. Although not particularly limited, the facility 100 is a relatively small facility. For example, the facility 100 has load equipment such as air conditioning equipment, lighting equipment, and AV (Audio Visual) equipment. Facility 100 may have a distributed power supply such as a solar cell apparatus, a storage battery apparatus, and a fuel cell apparatus.

For example, a facility 100P does not have the distributed power supply. A facility 100A has the solar cell apparatus. A facility 100B has the solar cell apparatus and the storage battery apparatus. A facility 100C has the solar cell apparatus. A facility 100D has the solar cell apparatus, the storage battery apparatus and the fuel cell apparatus. A facility 100E has the solar cell apparatus and the storage battery apparatus. A facility 100F does not have the distributed power supply.

Here, the facility 100P, the facility 100A, the facility 100B and the facility 100C are connected to the same low voltage power line 421. The facility 100D, the facility 100E and the facility 100F are connected to the same low voltage power line 422. The low voltage power line 421 and the low voltage power line 422 are branched at the substation equipment 420, and may be considered as different low voltage power lines.

In the following, a flow of power from the low voltage power line to the facility 100 may be referred to as a power flow. The flow of power from the facility 100 to the low voltage power line may be referred to as a reverse power flow.

The power management server 200 is a server that provides a mechanism for purchase and sale of the power between two or more facilities. Specifically, the power management server 200 matches the power purchasing facility that intends to purchase power with the power selling facility that intends to sell power. In the embodiment, the facility 100P is an example of the power purchasing facility. The facilities 100A to 100F are candidates for the power selling facility. Facilities 300A to 300C, which will be described below, may also be candidates for the power selling facility.

The power management server 200 may be a server managed by a power operator such as a power generation operator, a power distribution operator, a retailer, or a resource aggregator. The resource aggregator is a power operator that provides the reverse tidal current power to the power generation operator, the power distribution operator, the retailer, and the like in a virtual power plant (VPP). The resource aggregator may be a power operator that produces surplus power (negawatt power) by reducing the consumed power of the facility managed by the resource aggregator. Such surplus power may be regarded as generated power. The resource aggregator may be a power operator that absorbs excessive power by increasing the consumed power of the facility managed by the resource aggregator (for example, increasing the charge amount of the storage battery apparatus).

The power management server 200 transmits, to the facility 100, a control message instructing control of a distributed power supply provided in the facility 100. For example, the power management server 200 may transmit a tidal current control message (for example, demand response (DR)) requesting the control of the tidal current. The power management server 200 may transmit the reverse tidal current control message requesting the control of the reverse tidal current. Further, the power management server 200 may transmit a power supply control message that controls an operating state of the distributed power supply. A degree of control of the tidal current or the reverse tidal current may be represented by an absolute value (for example, ∞ kW) or a relative value (for example, ∞ %). Alternatively, the degree of control of the tidal current or the reverse tidal current may be represented by two or more levels. The degree of control of the tidal current or the reverse tidal current may be represented by a power rate (real time pricing (RTP)) defined by the current power demand and supply balance. The degree of control of the tidal current or the reverse tidal current may be represented by a power rate (time of use (TOU)) defined by the past power demand and supply balance.

The facility 300 is connected to the high voltage power line. The high voltage power line is an example of the power grid, and is a power line corresponding to a voltage higher than that of the low voltage power line. Although not particularly limited, the facility 300 is a relatively large-scale facility.

For example, the facility 300A is a thermal power plant. The facility 300B is a nuclear power plant. The facility 300C is a wind power plant. However, the facility 300 may be a facility having a large number of solar cell apparatuses. The facility 300 may be a facility having a large number of storage battery apparatuses. The facility 300A to the facility 300A to the facility 300C is an example of the base power supply.

The network 410 is a network that connects the facility 100, the power management server 200, and the facility 300. Although not particularly limited, the network 410 may be a dedicated line such as a VPN (Virtual Private Network).

The substation equipment 420 is equipment that converts the voltage of the high voltage power line into the voltage of the low voltage power line. A plurality of low voltage power lines may be connected to the substation equipment 420. A plurality of high voltage power lines may be connected to the substation equipment 420.

The user terminal 500 is a terminal belonging to a user of the facility 100P. The user terminal 500 may be a terminal such as a personal computer, a smartphone, or a tablet PC.

In the embodiment, communication between the power management server 200 and the facility 100 may be performed according to a first protocol. On the other hand, communication between the facility 100 and the distributed power supply may be performed according to a second protocol different from the first protocol. Further, communication between the power management server 200 and the distributed power supply may be performed according to the first protocol. For example, as the first protocol, a protocol conforming to open automated demand response (Open ADR) or an original dedicated protocol can be used. For example, as the second protocol, a protocol conforming to ECHONET Lite, smart energy profile (SEP) 2.0, KNX, or the original dedicated protocol can be used.

Power Management Server

Figure 2:
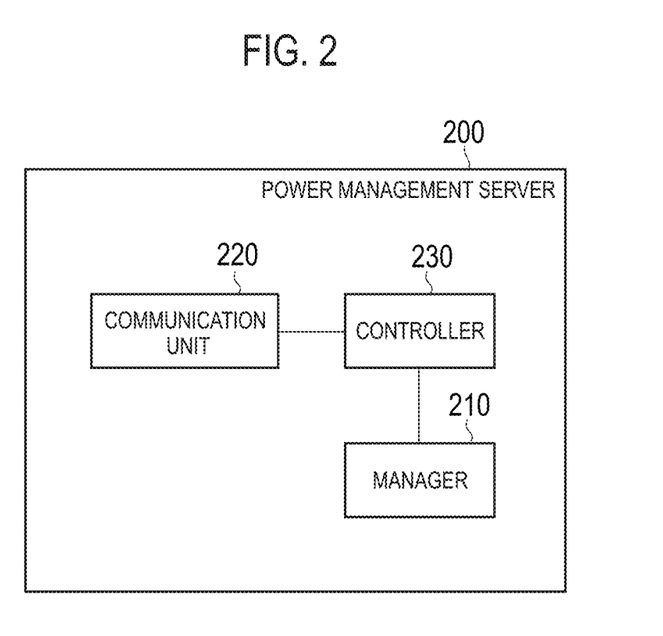
FIG. 2 is a diagram illustrating a power management server 200 according to the embodiment.

The power management server according to the embodiment will be described below. As illustrated in FIG. 2, the power management server 200 includes a manager 210, a communication unit 220, and a controller 230.

A manager 210 includes a non-volatile memory and/or a storage medium such as an HDD, and manages data on two or more facilities 100 managed by the power management server 200. The two or more facilities 100 managed by the power management server 200 may be the facilities 100 having a contract with an entity that manages the power management server 200. For example, the data on the facility 100 may be demand power supplied from the power grid to the facility 100. The data on the facility 100 may be an amount of power reduced at each facility 100 in response to a demand reduction request (DR; Demand Response) for the entire power grid. The data on the facility 100 may be a type of the distributed power supply provided in the facility 100, specifications of the distributed power supply provided in the facility 100, and the like. The specifications may be rated power generation (W) of the solar cell apparatus, the maximum output power (W) of the storage battery apparatus, and the maximum output power (W) of the fuel cell apparatus. Further, the data on the facility 100 may be the amount of output power instructed to the distributed power supply in the past. For example, when the distributed power supply is the storage battery apparatus, the data on the facility 100 may be the amount of discharge power instructed to the storage battery apparatus. The data on the facility 100 may be the degree of deterioration of the distributed power supply. For example, when the distributed power supply is the storage battery apparatus, the data on the facility 100 may be SOH (State Of Health) of the storage battery apparatus.

Figure 3:
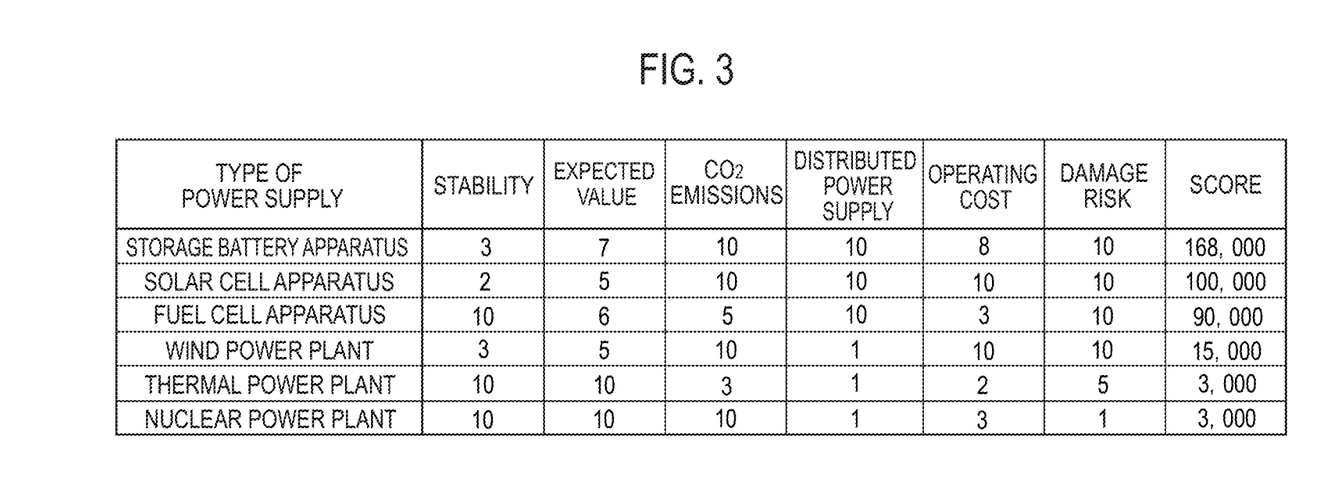
FIG. 3 is a diagram for explaining an evaluation value according to the embodiment.

In the embodiment, as illustrated in FIG. 3, the manager 210 manages the evaluation value associated with a power source that supplies the power to the power purchasing facility. Examples of the power source include the solar cell apparatus, the storage battery apparatus, the fuel cell apparatus, the thermal power plant, the nuclear power plant, and the wind power plant. The manager 210 may manage an index value used for calculating the evaluation value. Examples of the index value include stability, expected value, $CO_2$ emissions, distributed power supply, operating cost, and damage risk.

The stability is an index value related to the degree to which supply of power can be stably continued. It is considered that the index value of the stability is relatively low for the storage battery apparatus whose remaining charge may fluctuate, the solar cell apparatus whose power generation amount may fluctuate depending on an amount of solar radiation, and the wind power plant whose power generation amount may fluctuate depending on an air flow rate.

The expected value is an index value related to the degree to which the supply of power can be expected. It is considered that the index value of the expected value is relatively low for the solar cell apparatus, the storage battery apparatus, and the fuel cell apparatus, which are affected by the power consumption, the remaining charge, the amount of solar radiation, or the like of the facility 100. It is considered that the index value of the expected value is relatively low for the wind power plant whose power generation amount may fluctuate depending on the air flow rate.

The $CO_2$ emissions are an index value related to the $CO_2$ amount emitted by the power source. Since the fuel cell apparatus and the thermal power plant are considered to have high $CO_2$ emissions, the index value of $CO_2$ emissions is considered to be relatively low.

The distributed power supply is an index value indicating whether the power source is the distributed power supply. If the power source is the distributed power supply, since local production for local consumption can be expected, the index value of the distributed power supply is considered to be high.

The operating cost is an index value related to the operating cost of the power source. As for the solar cell apparatus and the wind power plant, the index value of the operating cost is considered to be high because natural energy is used.

The damage risk is an index value related to a risk of damage for a disaster. As for the thermal power plant and the nuclear power plant, the index value of the damage risk is considered to be low because the damage for the disaster is large.

In FIG. 3, the evaluation value associated with the power source used for selling power is determined based on the stability, the expected value, the $CO_2$ emissions, the operating cost, and the damage risk. However, the embodiment is not limited to this. The evaluation value associated with the power source used for selling power may be determined based on at least one of the stability, the expected value, the $CO_2$ emissions, the operating cost, and the damage risk.

The communication unit 220 includes a communication module, and communicates with the facility 100 through the network 400. As described above, the communication unit 220 performs communication according to the first protocol. For example, the communication unit 220 transmits a first message to the facility 100 according to the first protocol. The communication unit 220 receives a first message response from the facility 100 according to the first protocol.

In the embodiment, the communication unit 220 communicates with the user terminal 500. The communication unit 220 receives a message (a score request) requesting the score of the power source provided in the power selling facility from the user terminal 500. The communication unit 220 transmits a message (a score response) including the score of the power source provided in the power selling facility to the user terminal 500. That is, the communication unit 220 constitutes that notifies the user terminal 500 of the score.

The controller 230 includes a memory, a CPU, and the like, and controls each component provided in the power management server 200. For example, the controller 230 transmits a control message to instruct the facility 100 to control the distributed power supply provided in the facility 100. As described above, the control message may be a tidal current control message, a reverse tidal current control message, or a power supply control message.

In the embodiment, the controller 230 determines a power selling facility other than the power purchasing facility from two or more facilities by an input from the user terminal 500 corresponding to the power purchasing facility (for example, the facility 100P). The controller 230 calculates the score indicating a value of purchase and sale of the power based on a communication time in a communication path between the power selling facility and the power purchasing facility.

For example, the input from the user terminal 500 is the score request described above. The score request may include an information element that specifies all or part of the power selling facility that can supply power to the power purchasing facility. The information element that specifies a part of the power selling facility may include an information element that indicates a condition that the distance of the power path to the base power supply is equal to or greater than the threshold value. Such an information element may include an information element indicating a condition that the facility is connected to the low voltage power line. The information element that specifies a part of the power selling facility may include an information element indicating the condition that the facility is connected to the low voltage power line to which the power purchasing facility is connected. The information elements that specify a part of the power selling facility may include an information element indicating conditions that the stability is high, the expected value is high, the $CO_2$ emissions are low, the power source is the distributed power supply, the operating cost is low, and the damage risk is low, or the like.

For example, the communication time in the communication path may be represented by an RTT (Round Trip Time) between the power selling facility and the power purchasing facility. In the embodiment, since the communication path between the power selling facility and the power purchasing facility passes through the power management server 200, the RTT between the power selling facility and the power purchasing facility is a total of the RTT between the power selling facility and the power management server 200 and the RTT between the power purchasing facility and the power management server 200.

For example, consider a case where the facility 100P is the power purchasing facility, and the facility 100A to the facility 100F and the facility 300A to the facility 300C are candidates for the power selling facility.

Figure 4:
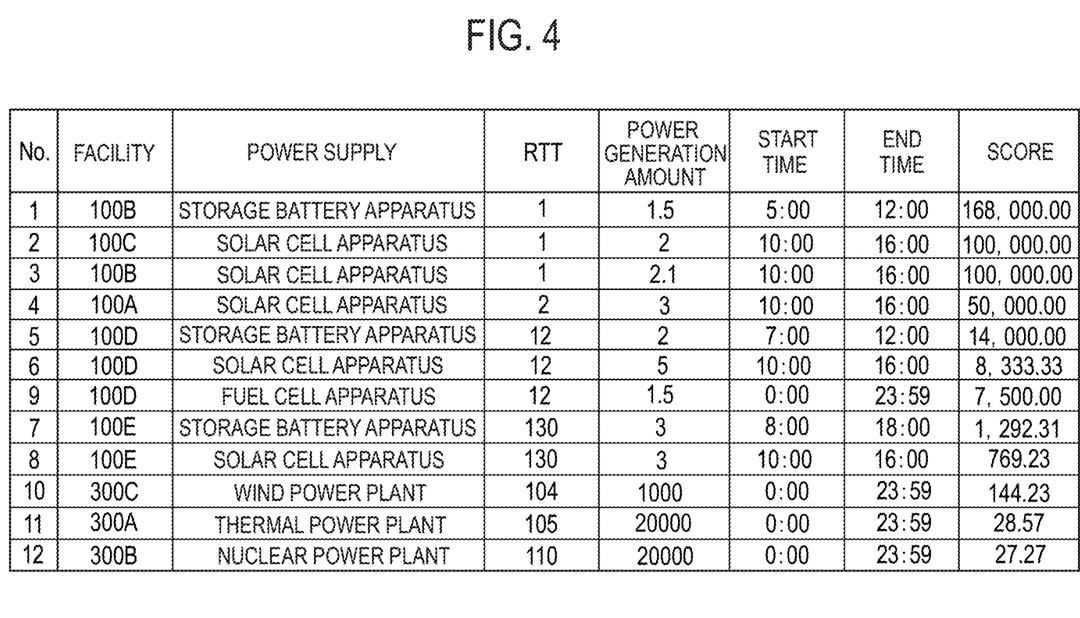
FIG. 4 is a diagram for explaining a score according to the embodiment.

As illustrated in FIG. 4, the controller 230 calculates the score indicating the value of purchase and sale of the power by correcting the evaluation value shown in FIG. 3 by the communication time (RTT) in the communication path. Specifically, the controller 230 corrects the evaluation value so that the score is higher as the RTT is smaller.

In the embodiment, the evaluation value shown in FIG. 3 varies depending on the type of the power source. Therefore, as a result, the controller 230 calculates the score based on the type of the power source.

In the embodiment, the evaluation value shown in FIG. 3 is determined based on at least one of the stability, the expected value, the $CO_2$ emissions, the operating cost, and the damage risk. Therefore, as a result, the controller 230 calculates the score based on at least one of the stability, the expected value, the $CO_2$ emissions, the operating cost, and the damage risk.

The controller 230 may exclude a facility having a distance of the power path to the base power supply less than the threshold value from the candidates for the power selling facility. For example, the controller 230 may exclude the facility 300A to the facility 300C from the candidates for the power selling facility. The exclusion may be a process of calculating the score as zero, or a process of not determining as the power selling facility.

The controller 230 may exclude a facility that is not connected to the low voltage power line to which the power purchasing facility is connected from the candidates for the power selling facility. That is, in this case, the power selling facility is the facility connected to the low voltage power line to which the power purchasing facility is connected. For example, the controller 230 may exclude the facility 100D to the facility 100F from the candidates for the power selling facility. The exclusion may be a process of calculating the score as zero, or a process of not determining as the power selling facility.

The controller 230 may calculate the score based on the amount of power that can be output from the power source (hereinafter, referred to as an output power capacity). When the power source is the distributed power supply, the output power capacity may be the amount of power that the distributed power supply can be the reverse power flow. For example, the controller 230 calculates the score so that the score is lower as the output power capacity is smaller than a power purchase amount requested by the user of the power purchasing facility. The controller 230 may exclude a facility having an output power capacity smaller than the power purchase amount from the candidates for the power selling facility.

Power Management Method

The power management method according to the embodiment will be described below.

Figure 5:
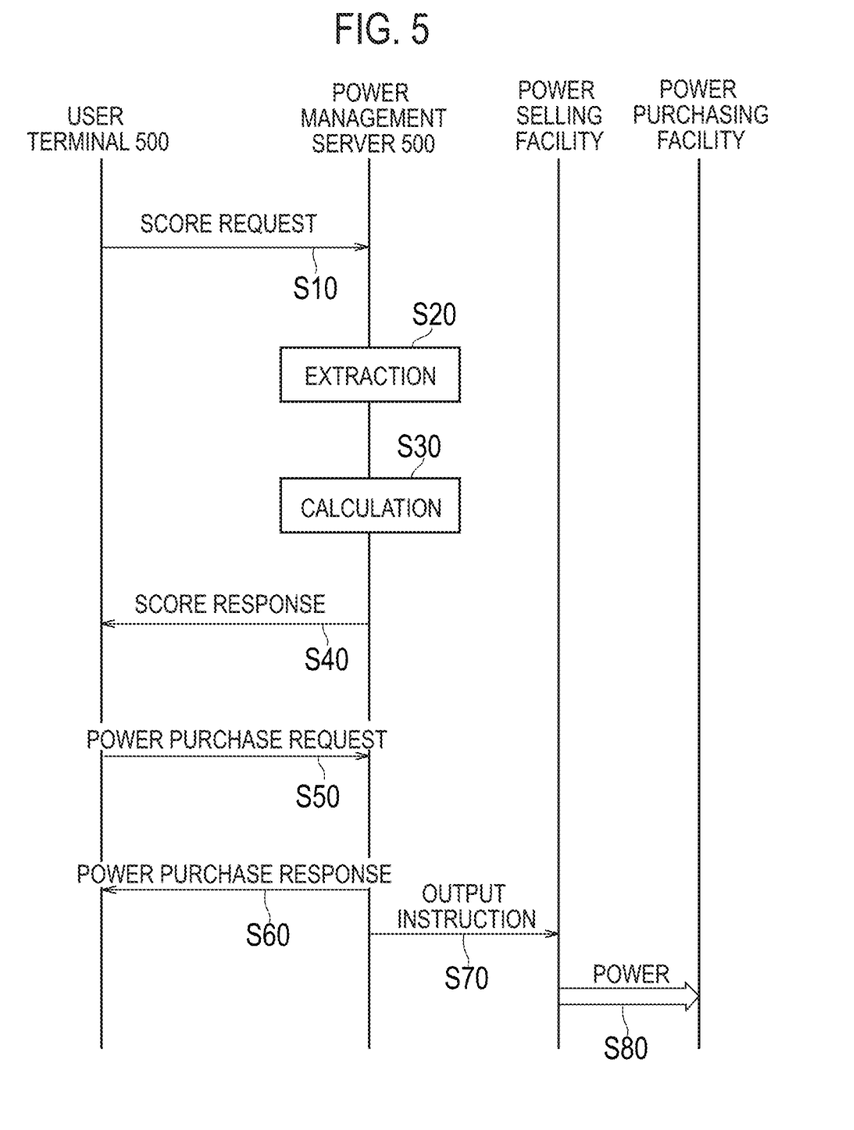
FIG. 5 is a diagram illustrating a power management method according to the embodiment.

As illustrated in FIG. 5, in Step S10, the user terminal 500 transmits the message (score request) requesting the score of the power source provided in the power selling facility to the power management server 200. As described above, the score request may include the information element that specifies all or part of the power selling facility that can supply power to the power purchasing facility.

In Step S20, the power management server 200 determines the power selling facility other than the power purchasing facility from two or more facilities by the input from the user terminal 500 corresponding to the power purchasing facility.

In Step S30, the power management server 200 calculates the score indicating the value of purchase and sale of the power based on the communication time in the communication path between the power selling facility and the power purchasing facility. For example, the power management server 200 calculates the score shown in FIG. 4. Since a method of calculating the score is as described above, details thereof will be omitted.

In Step S40, the power management server 200 transmits the message (score response) including the score of the power source provided in the power selling facility to the user terminal 500.

In Step S50, the user terminal 500 transmits a message (power purchase request) including an information element indicating the power selling facility selected by the user to the power management server 200. Here, the user terminal 500 may display a list of scores shown in FIG. 4 in order to allow the user to select the power selling facility in response to receiving the score response.

In Step S60, when the matching between the power purchasing facility and the power selling facility is established, the power management server 200 transmits a message (power purchase response) including an information element indicating the establishment of the matching to the user terminal 500. When the matching between the power purchasing facility and the power selling facility is not established, the power management server 200 may send the message (power purchase response) including an information element indicating unsuccessful matching to the user terminal 500. In the following, the description will proceed assuming that the matching has been established.

In Step S70, the power management server 200 transmits a message (an output instruction) instructing the power selling facility to output power to the power selling facility selected by the user.

In Step S80, the power selling facility outputs power to the power grid. In FIG. 5, for the sake of clarity, a diagram in which the power is supplied from the power selling facility to the power purchasing facility is illustrated, however, this is not intended to supply power directly from the power selling facility to the power purchasing facility by a dedicated power line. An operation of outputting power from the power selling facility to the power grid and an operation of supplying power from the power grid to the power purchasing facility may be performed separately, and in the case of purchase and sale of the power in real time, these operations may be performed at substantially the same timing when the matching is established.

Operation and Effect

In the embodiment, the power management server 200 calculates the score indicating the value of purchase and sale of the power based on the communication time in the communication path between the power selling facility and the power purchasing facility. According to such a configuration, in the case of purchase and sale of the power in real time, the matching between the power purchasing facility and the power selling facility can be appropriately realized.

For example, in the case of providing the mechanism for purchase and sale of the power between two or more facilities in which the distance of the power path to the base power supply is equal to or greater than the threshold value, it is possible to suppress imbalance between supply and demand of power caused by a difference between the timing of the reverse power flow and the timing of the power flow.

MODIFICATION

A modification of the embodiment will be described below. In the following, differences from the embodiments will be mainly described.

In the embodiment, a case where the RTT is used as the communication time in the communication path has been described. In contrast, in the modification, a case where the number of hops is used as the communication time in the communication path will be described.

Figure 6:
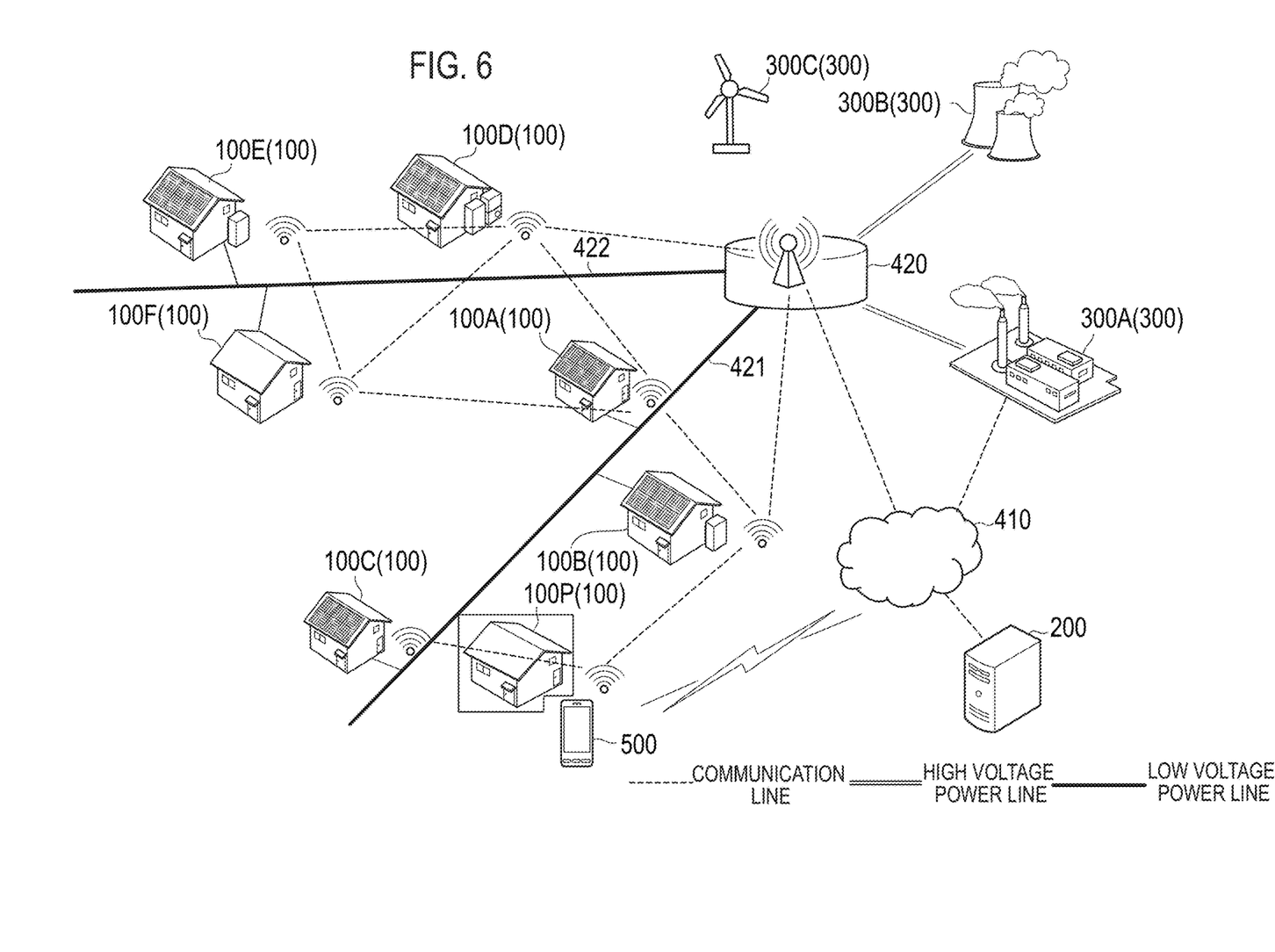
FIG. 6 is a diagram illustrating the power management system 10 according to a modification.

As illustrated in FIG. 6, in the power management system 10, the facility 100 constitutes an ad-hoc network including a wireless communication network. The ad-hoc network may include a wired communication network instead of the wireless communication network. In such a case, the communication path between the power purchasing facility and the power selling facility does not need to pass through the power management server 200.

In such a case, the power management server 200 manages the number of hops between the facilities 100. The number of hops is represented by the number of facilities 100 provided in the communication path. The number of hops may be notified from the facility 100.

Figure 7:
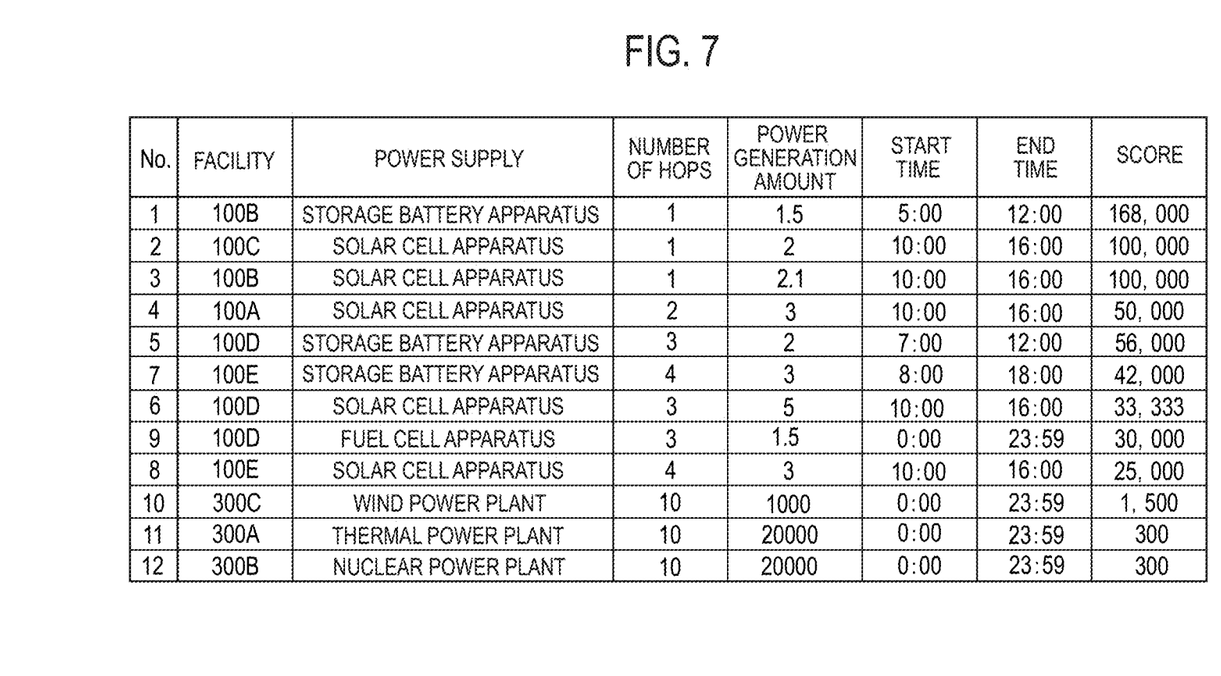
FIG. 7 is a diagram for explaining the score according to the modification.

Specifically, as illustrated in FIG. 7, the power management server 200 corrects the evaluation value shown in FIG. 3 by the communication time (the number of hops) in the communication path, to calculate the score indicating the value of purchase and sale of the power. Specifically, the controller 230 corrects the evaluation value so that the score is higher as the number of hops is smaller. In other words, the power management server 200 may generate the list of scores shown in FIG. 7 instead of the list of scores shown in FIG. 4.

OTHER EMBODIMENTS

Although the present disclosure has been described by the embodiments described above, the statements and drawings that form a part of this disclosure should not be understood to limit this invention. Various alternative embodiments, examples and operational techniques will be apparent to those skilled in the art from this disclosure.

In the embodiment, the power purchase request includes the information element indicating the power selling facility selected by the user. However, the embodiment is not limited to this. The power purchase request may include an information element indicating the power source selected by the user in addition to the information element indicating the power selling facility selected by the user. That is, when the power selling facility has two or more types of power sources, since the scores of the two or more types of power sources are different, the user may be able to select the power source provided in the power selling facility.

Although not particularly mentioned in the embodiment, the user terminal 500 may be considered to be synonymous with the power purchasing facility. In such a case, the user terminal 500 may be a terminal provided in the power purchasing facility. The communication time in the communication path may be the communication time in the communication path between the user terminal 500 and the power selling facility.

Although not particularly mentioned in the embodiment, the user terminal 500 may be a terminal during staying or due to stay at the power purchasing facility. Examples of such a usage scene include a usage scene in which the user of the user terminal 500 charges an electric vehicle at a friend's house when the power purchasing facility is the friend's house, and a usage scene in which the user of the user terminal 500 charges the smartphone at a restaurant when the power purchasing facility is the restaurant.

In the embodiment, the evaluation value is determined based on at least one of the stability, the expected value, the $CO_2$ emissions, the operating cost, and the damage risk. However, the embodiment is not limited to this. The evaluation value may be set by the user of the power purchasing facility. The evaluation value may be determined in advance.

In the embodiment, determination of the power selling facility and calculation of the score is performed by the power management server 200. However, the embodiment is not limited to this. The determination of the power selling facility and the calculation of the score may be performed by any apparatus as long as it is an apparatus connected to the network 410. The determination of the power selling facility and the calculation of the score may be performed by cooperation of two or more apparatuses. The determination of the power selling facility and the calculation of the score may be performed by the user terminal 500, may be performed by one or more terminals belonging to users of the power selling facilities, and may be performed by a cloud server that can be accessed by two or more user terminals.

Note that the entire contents of Japanese Patent Application No. 2018-156876 (filed on Aug. 24, 2018) are incorporated in the present specification by reference.

The invention claimed is:

1. A power management system for providing a mechanism of power transaction between two or more facilities connected to a power grid, the system comprising:
 a communication unit configured to receive, from an input of a user terminal, a request for a score, the score indicating an evaluation of each first facility of first facilities of the two or more facilities, the user terminal corresponding to a second facility of the two or more facilities, the request including an information element that specifies at least part of the first facilities; and
 a controller configured to, in response to receiving the request for the score from the input of the user terminal, extract, from the two or more facilities, the first facilities to sell power other than the second facility to purchase power, based on the input from the user terminal, and calculate the score indicating the evaluation of each first facility of the first facilities based on a communication time in a communication path between each first facility of the first facilities and the second facility, wherein the communication unit is configured to
  notify the user terminal of the calculated score; and
  receive, from the user terminal, a message responsive to the calculated score and indicating a selected first facility of the first facilities to sell power,
 the selected first facility is controlled by the controller to output power to the second facility in response to the message from the user terminal being received by the communication unit, the information element indicates at least one of
- a condition that a distance of a power path to a base power supply is equal to or greater than a threshold value,
- a condition that each first facility of the first facilities is connected to a low voltage power line,
- a condition that each first facility of the first facilities is connected to a low voltage power line to which the second facility is connected, or
- at least one of stability, expected value, $CO_2$ emissions, operating cost, or damage risk, and the controller is configured to exclude, from candidates for the first facilities to sell power, at least one of
- a facility having the distance of the power path to the base power supply less than the threshold value,
- a facility that is not connected to the low voltage power line, or
- a facility having an output power capacity smaller than a power purchase amount requested by a user of the second facility.

2. The power management system according to claim 1, wherein the information element indicates the condition that the distance of the power path from each first facility of the first facilities to the base power supply is equal to or greater than the threshold value.

3. The power management system according to claim 1, wherein the communication path passes through a power management server including the controller and the communication unit.

4. The power management system according to claim 1, wherein the controller is configured to calculate the score based on a type of a power source of each first facility of the first facilities.

5. The power management system according to claim 1, wherein the controller is configured to calculate the score based on power which can be output from a power source of each first facility of the first facilities.

6. The power management system according to claim 1, wherein the controller is configured to calculate the score based on the information element indicating the at least one of the stability, the expected value, the $CO_2$ emissions, the operating cost, or the damage risk when power is output from a power source of each first facility of the first facilities.

7. The power management system according to claim 1, wherein
for each first facility of the first facilities, the communication time includes a Round Trip Time (RTT) between the first facility of the first facilities and the second facility.

8. The power management system according to claim 7, wherein the communication path passes through a power management server including the controller and the communication unit, and
for each first facility of the first facilities, the RTT is a total of an RTT between the first facility of the first facilities and the power management server and an RTT between the second facility and the power management server.

9. The power management system according to claim 1, wherein the communication time includes a number of hops in the communication path.

10. The power management system according to claim 1, wherein the information element indicates the condition that each first facility of the first facilities is connected to the low voltage power line to which the second facility is connected.

11. A power management method of providing a mechanism of power transaction between two or more facilities connected to a power grid, the method comprising:
receiving, from an input of a user terminal, a request for a score, the score indicating an evaluation of each first facility of first facilities of the two or more facilities, the user terminal corresponding to a second facility of the two or more facilities, the request including an information element that specifies at least part of the first facilities;
in response to receiving the request for the score from the input of the user terminal, extracting, from the two or more facilities, the first facilities to sell power other than the second facility to purchase power, based on the input from the user terminal;
calculating the score indicating the evaluation of each first facility of the first facilities based on a communication time in a communication path between each first facility of the first facilities and the second facility;
notifying the user terminal of the calculated score;
receiving, from the user terminal, a message responsive to the calculated score and indicating a selected first facility of the first facilities to sell power; and
controlling the selected first facility to output power to the second facility in response to the message from the user terminal being received by the communication unit,
wherein
the information element indicates at least one of
- a condition that a distance of a power path to a base power supply is equal to or greater than a threshold value,
- a condition that each first facility of the first facilities is connected to a low voltage power line,
- a condition that each first facility of the first facilities is connected to a low voltage power line to which the second facility is connected, or
- at least one of stability, expected value, $CO_2$ emissions, operating cost, or damage risk, and the method further comprises excluding, from candidates for the first facilities to sell power, at least one of
- a facility having the distance of the power path to the base power supply less than the threshold value,
- a facility that is not connected to the low voltage power line, or
- a facility having an output power capacity smaller than a power purchase amount requested by a user of the second facility.

12. The power management method according to claim 11, wherein the information element indicates the condition that the distance of the power path from each first facility of the first facilities to the base power supply is equal to or greater than the threshold value.

13. The power management method according to claim 11, wherein the communication path passes through a power management server configured to perform the determining and the calculating.

14. The power management method according to claim 11, wherein the calculating includes calculating the score based on a type of a power source of each first facility of the first facilities.

15. The power management method according to claim 11, wherein the calculating includes calculating the score based on power which can be output from a power source of each first facility of the first facilities.

16. The power management method according to claim 11, wherein the calculating includes calculating the score based on the information element indicating the at least one of the stability, the expected value, the $CO_2$ emissions, the operating cost, or the damage risk when power is output from a power source of each first facility of the first facilities.

17. The power management method according to claim 11, wherein for each first facility of the first facilities, the communication time includes a Round Trip Time (RTT) between the first facility of the first facilities and the second facility.

18. The power management method according to claim 17, wherein the communication path passes through a power management server configured to perform the determining and the calculating, and
    for each first facility of the first facilities, the RTT is a total of an RTT between the first facility of the first facilities and the power management server and an RTT between the second facility and the power management server.

19. The power management method according to claim 11, wherein the communication time includes a number of hops in the communication path.

20. The power management method according to claim 11, wherein the information element indicates the condition that each first facility of the first facilities is connected to the low voltage power line to which the second facility is connected.

* * * * *